United States Patent [19]

Heinzman

[11] Patent Number: 4,826,275

[45] Date of Patent: May 2, 1989

[54] OPTICAL COMMUNICATION SYSTEMS USING STAR COUPLERS

[75] Inventor: Homer W. Heinzman, Arlington, Tex.

[73] Assignee: LTV Aerospace and Defense Company, Dallas, Tex.

[21] Appl. No.: 132,880

[22] Filed: Dec. 14, 1987

[51] Int. Cl.[4] .............................................. G02B 6/28
[52] U.S. Cl. .................................. 350/96.16; 455/612
[58] Field of Search ......................... 350/96.15, 96.16; 250/227; 455/609, 612

[56] References Cited

U.S. PATENT DOCUMENTS

| | | | |
|---|---|---|---|
| 4,072,399 | 2/1978 | Love | 350/96.16 |
| 4,166,946 | 9/1979 | Chown et al. | 250/199 |
| 4,234,968 | 11/1980 | Singh | 455/607 |
| 4,234,969 | 11/1980 | Singh | 455/607 |
| 4,330,170 | 5/1982 | Johnson et al. | 350/96.16 |
| 4,336,047 | 6/1982 | Pavlopoulos et al. | 65/3.31 |
| 4,449,781 | 5/1984 | Lightstone et al. | 350/96.15 |
| 4,457,581 | 7/1984 | Johnson et al. | 350/96.16 |
| 4,511,208 | 4/1985 | Ozeki et al. | 350/96.16 |
| 4,550,974 | 11/1985 | Murphy | 350/96.15 |
| 4,573,215 | 2/1986 | Oates et al. | 455/607 |
| 4,687,284 | 8/1987 | Rawson et al. | 350/96.16 |
| 4,708,424 | 11/1987 | Marhic | 350/96.16 |

OTHER PUBLICATIONS

Storozum et al., Fault-Tolerant Fiber Optic Lans, Photonics Spectra, Sep. 1984, pp. 61, 62, 64, 65 and 68.

*Primary Examiner*—William L. Sikes
*Assistant Examiner*—Frank González
*Attorney, Agent, or Firm*—Arnold, White & Durkee

[57] ABSTRACT

Optical communication system having repeater amplifiers cascaded with plurality of optical star couplers wherein each star coupler is coupled to an associated set of terminals. Each star coupler has two mixing sections serially disposed between its input and output terminal ports. Star couplers receive optical signals from their associated terminals, mix the received signals and retransmit the mixed signals to each terminal in its associated set and to each of the repeater amplifiers. Star couplers also receive amplified signals from the repeater amplifiers, mix the received amplified signal and retransmit the mixed optical signals only to their associated terminals. Star couplers, thus, enable optical signals transmitted by their associated terminals to be transmitted to each terminal in the system without permitting the same signal to be returned to the same star coupler, thereby avoiding the formation of continuous optical loops and hence avoiding the problem of optical lockup.

17 Claims, 4 Drawing Sheets

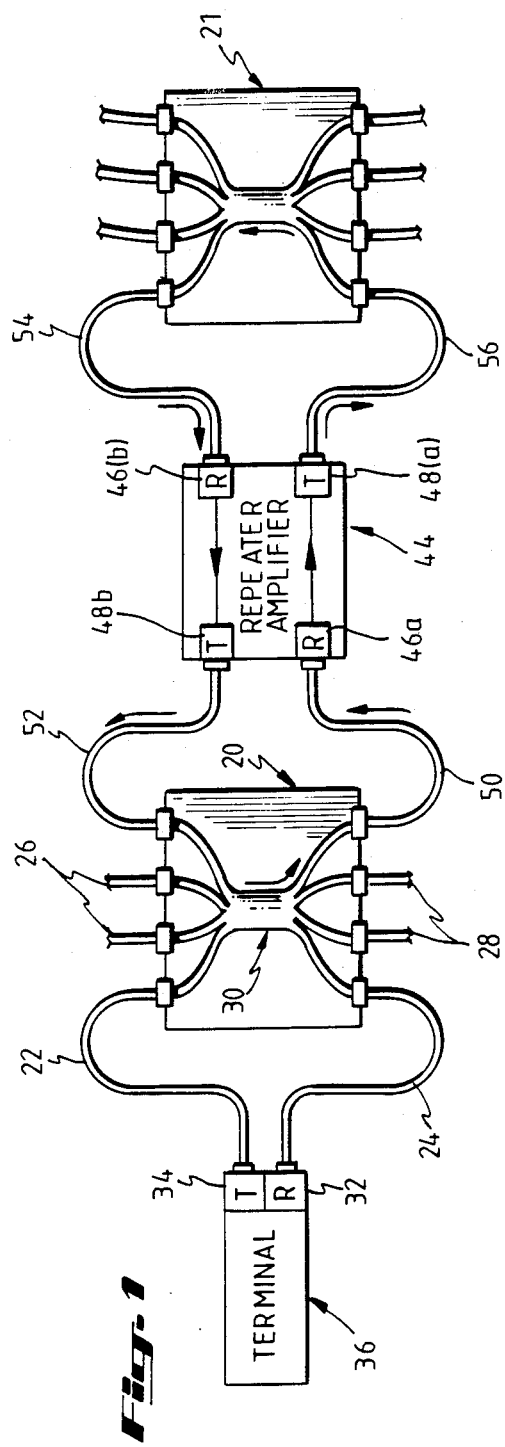
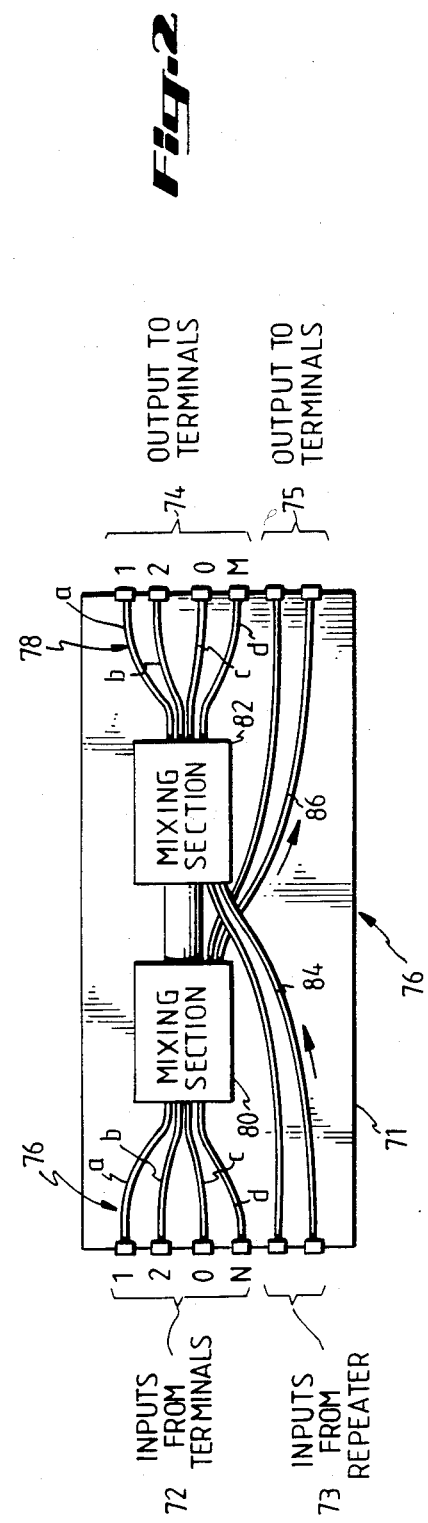

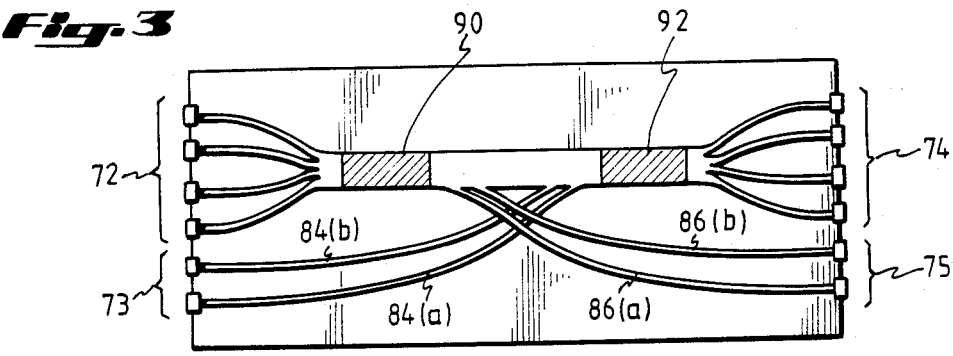
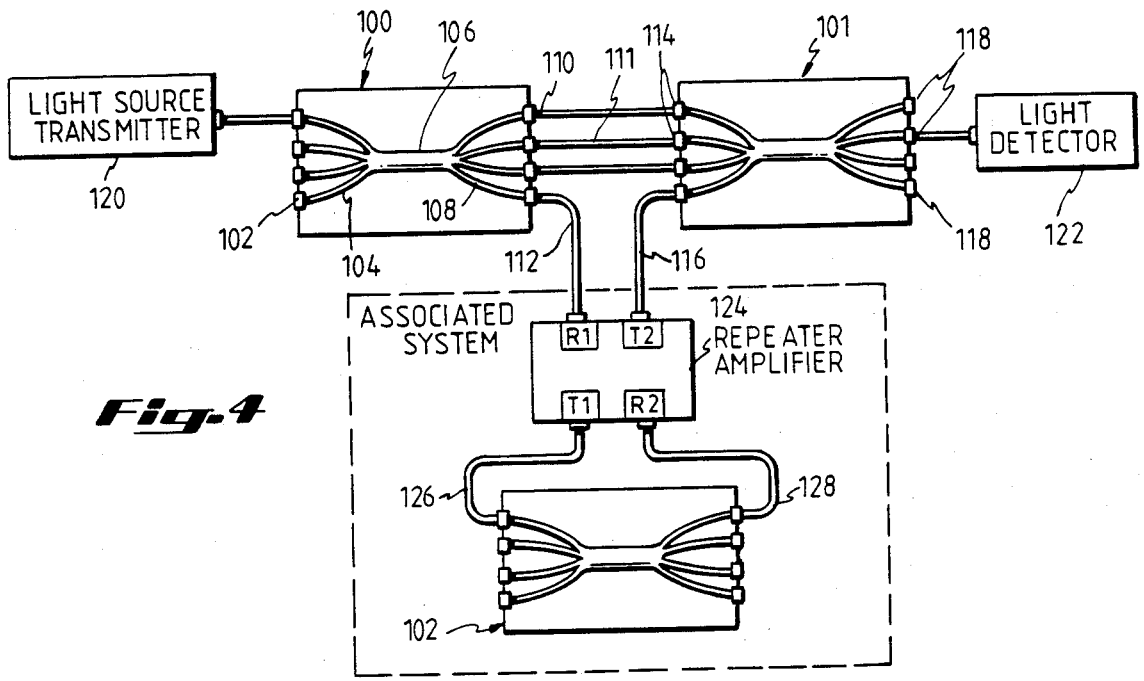
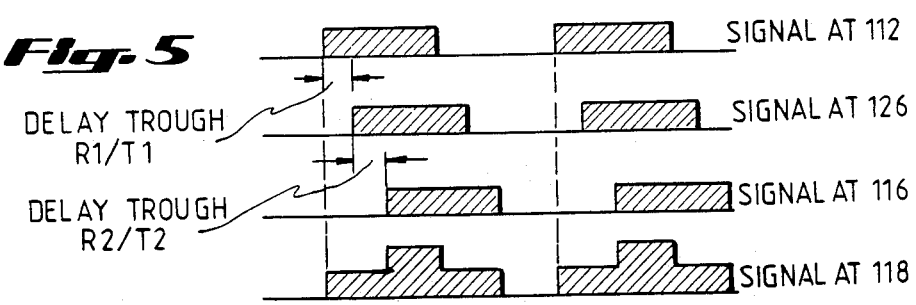

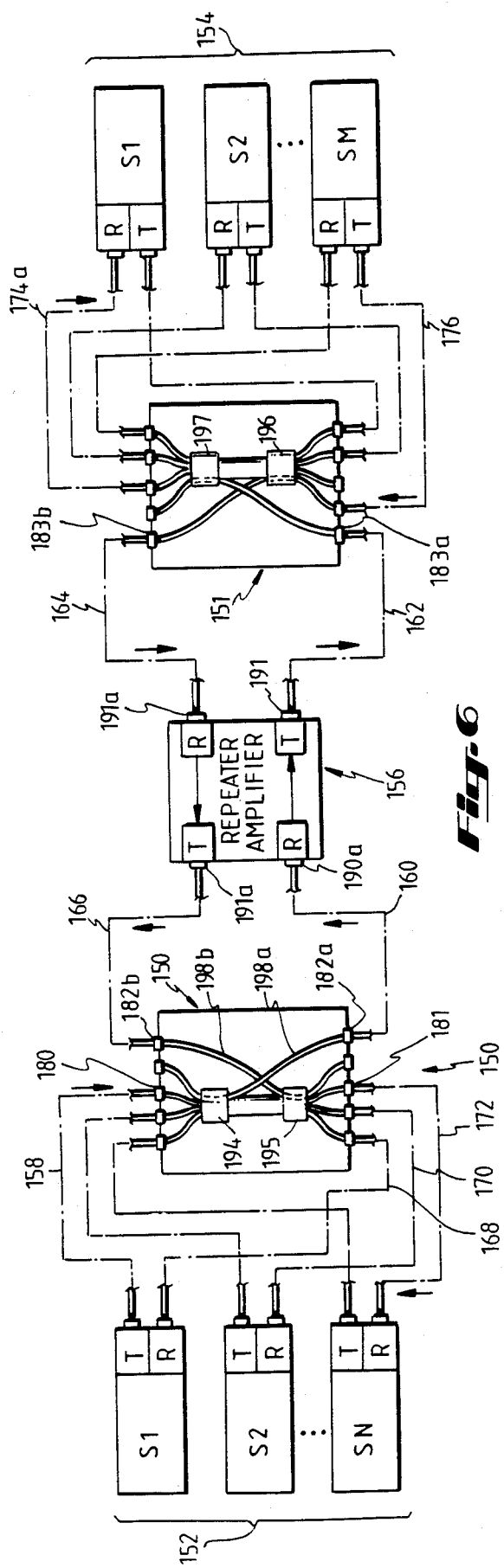
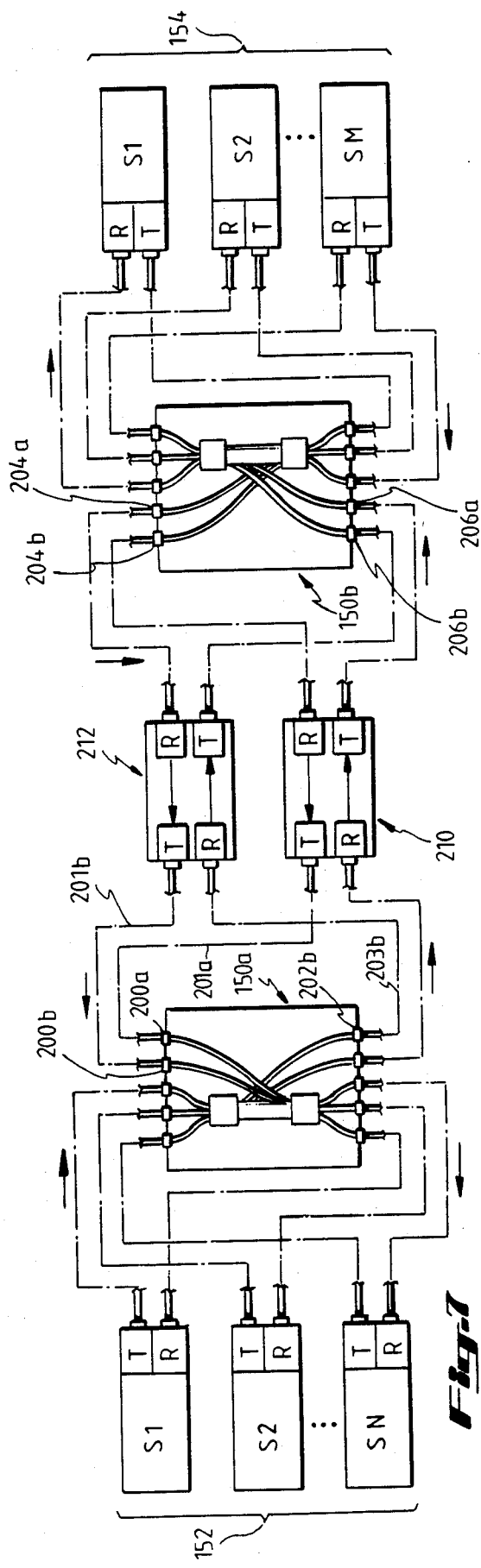

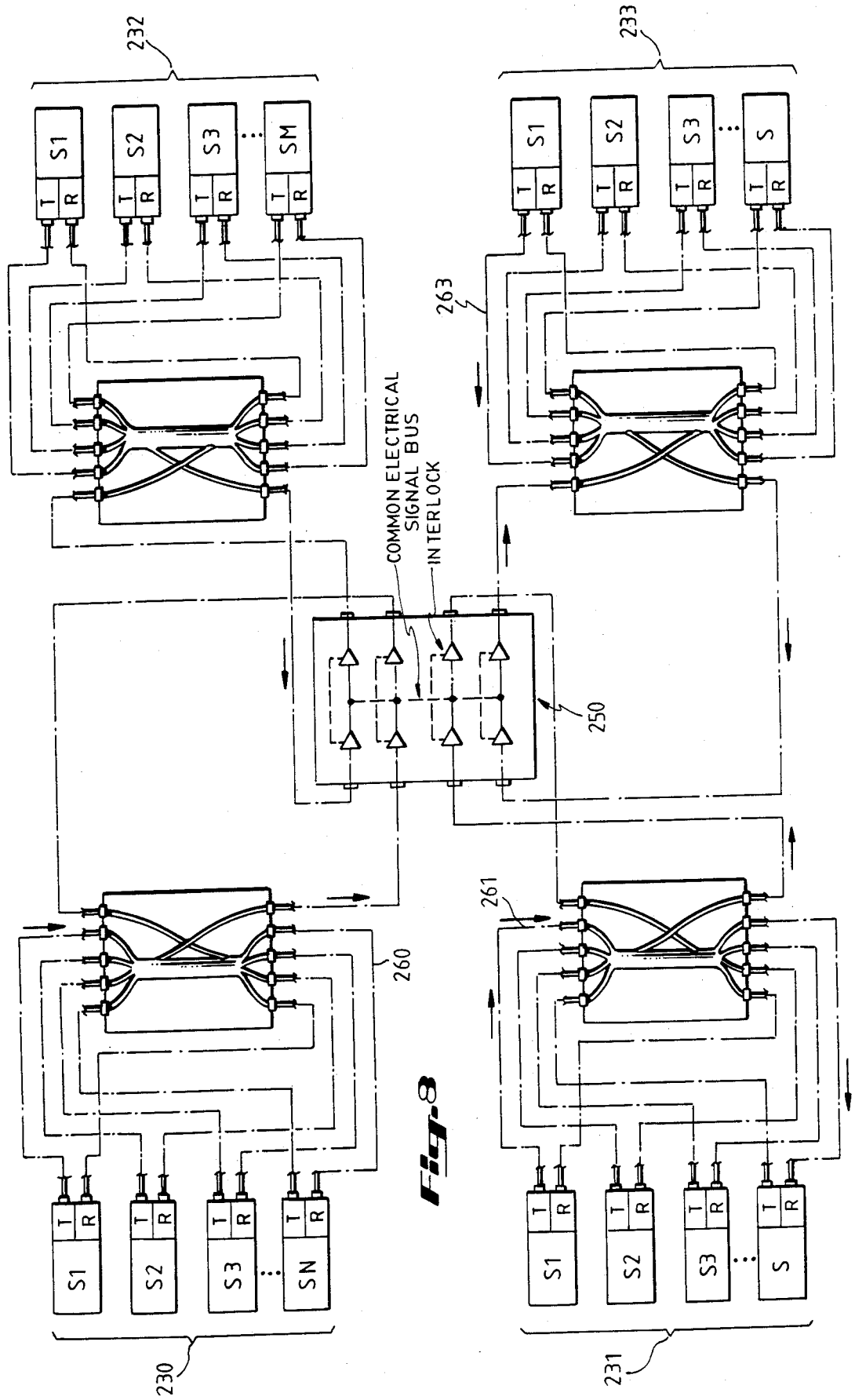

OPTICAL COMMUNICATION SYSTEMS USING STAR COUPLERS

BACKGROUND OF THE INVENTION

1. Field of the Invention

The invention relates to optically linked data processing systems and, more particularly, to optical star couplers for coupling optical transmission lines and a plurality of stations in such systems.

2. Background Art

Fiber-optic transmission of data offers many advantages over the conventional form of data transmission in data processing systems. Optical signals are generally immune to errors caused by electromagnetic interference and radio frequency interference, and these systems do not spark or short circuit. Fiber-optic transmission also eliminates ground loop problems by providing electrical isolation between optically linked equipment.

A fiber-optic system for data transmission may be employed in a distributor processing system, in a local area network, in a data bus system and the like. These systems frequently require the use of a plurality of processing stations or terminals to communicate with each other as well as with peripheral equipment. Fiber-optic transmission systems typically employ a ring or a star type architecture.

A ring type architecture generally uses Tee type couplers. A ring type architecture using Tee couplers is disclosed in the U.S. Pat. No. 4,072,399. Typically, in a ring type system, the light or the optical signal from one terminal is routed to the next terminal in the ring, where it is tapped off (received) and retransmitted. When an optical signal is tapped off, it reduces the signal level of the remaining signal being transmitted to the next terminal in the ring. In such an arrangement, there can be a substantial difference in the signal strength between a near terminal and a far terminal. This disparity in the signal strength can be avoided by each successive terminal receiving the signal, combining it with its own output and then retransmitting the new signal. One drawback of such a system is that the system fails when any terminal loses power, or when any cable breaks, or if any terminal is disconnected from the ring architecture. Because of these and other reasons, most fiber-optic data transmission systems use a star coupler architecture.

There are two types of star couplers; reflective type and transmissive type. A star coupler has a plurality of input ports for receiving optical signals and a plurality of output ports for transmitting optical signals. The reflective star coupler combines the optical signals in a mixing section. The mixing section is terminated with a mirror which reflects the optical signals back into cables that first brought the signal to the mixing section. The transmissive optical couplers receive the signals at one set of ports, combine these signals and then distribute a portion of the mixed signals to each of its output ports. Both types of star couplers work equally well backwards, i.e. the light entering the output ports will be distributed to the input ports. But for clarity, the ports are generally designated as input ports or output ports. The present invention applies to the transmissive type star couplers.

Although the figures in this application show the star coupler with inputs on one side and outputs on the other, such an arrangement is shown only for clarity and simplicity. As noted earlier, input ports and output ports are interchangeable. This arrangement may not be the best way to package the device. It is easier to control bends inside the coupler package than outside it. Therefore, the primary consideration should be to provide the best situation for the external optical fiber connection. In most applications, two fibers from each terminal are connected to the star coupler. These fibers should be kept together to the maximum extent possible instead of splitting them to go to different sides of the star coupler. Therefore, it may be desirable to have all fibers go to the coupler through one connector, which has fiber-optic pins or sockets. It is generally desirable to make the pin assignments (geometric configuration) in the star coupler such that the repeater circuits are separated from the terminals. In other words, the fibers going to the repeaters and the fibers going to the terminals go off in different directions. Additionally, a minimum separation of pairs of fibers from each other should be provided, and each pair should have a standardized color code — one color for high level (transmitter output) and the other color for the low level (star coupler to the repeater).

In a system configuration using star couplers, each star coupler receives the transmitted signal and divides the signal evenly to all the receiving terminals, thereby minimizing the differences in the signal levels between near and far terminals. However, this division of optical signal proportionally reduces the level of signal received by each terminal. As an example, if a star coupler receives a signal of level "Y" and transmits it to 24 terminals, then each terminal will receive a signal of level Y divided by 24. Thus, for a large system there is not much signal left for any terminal. The diminution of an optical signal because of its division in the star coupler is generally referred to as a "fan-out" or a "furcation" loss. Thus, the use of fiber-optics to interconnect a local area network or a data base transmission system is generally limited by these furcation losses. The present limitation is the use of approximately 64 terminals for each star coupler. Additionally, for large systems the terminals must be designed for a low signal level which is highly undesirable.

When a large number of outputs are required or inputs are clustered in several locations, it would be desirable to use a plurality of couplers cascaded with repeater amplifiers. However, when conventional star couplers are cascaded in this way, as shown in FIG. 1, the optical signal forms a continuous loop. This continuous loop phenomenon is called a "lockup". The lockup occurs because light output from the first star coupler is amplified by the repeater amplifier and sent to the second star coupler, where it is divided and a part of the signal is amplified again by the repeater amplifier and returned to the first star coupler, thereby constituting a loop. This problem has been avoided in the past by using only one star coupler in a system with enough ports for all terminals.

The present invention addresses the problem by providing a star coupler which when cascaded with repeater amplifiers does not lockup, while at the same time preserving the advantage of equal signal strength and the ability to monitor the system's integrity by monitoring its own signal returning from the star coupler.

SUMMARY OF THE INVENTION

The present invention discloses optical communication systems employing optical star couplers that do not lockup. The star coupler disclosed in the present invention comprises a plurality of input and output ports, at least one repeater input port, at least one repeater amplifier output port and two mixing sections connected in series between the input and output ports. The input ports are coupled via optical fibers to the first mixing sections which in turn is coupled to the second mixing section and the repeater amplifier output ports. The output ports are coupled via optical fibers to the second mixing section which in turn is coupled to the first mixing section and the repeater amplifier input ports. The optical signals received at the input ports are transmitted to the output ports and the repeater amplifier output port. The optical signals received at the repeater amplifier input terminals are transmitted only to the output ports. These star couplers when cascaded with the repeater amplifiers in an optical communication system do not permit the formation of a closed optical loop and thus avoiding the lockup problem.

The optical communication systems disclosed in the present invention comprise at least one repeater amplifier cascaded with a plurality of optical star couplers of the present invention and a plurality of terminals. Each star coupler is coupled to a corresponding set of terminals. Each star coupler receives optical signals from the terminals coupled to it, mixes these optical signals and retransmits the mixed optical signals to its associated terminals and also transmits a portion of the mixed signal to each of the repeater amplifiers. The repeater amplifiers receive the signals from the optical star couplers, amplify and retransmit the amplified signals to the star couplers in the system. Each star coupler receives optical signals from the repeater amplifiers, mixes them in one of its mixing sections and retransmits the mixed signal only to its associated terminals.

Examples of the more important features of this invention have thus been summarized rather broadly in order that the detailed description thereof that follows may be better understood, and in order that the contribution to the art may be better appreciated. There are, of course, additional features of the invention that are described hereinafter and which also form the subject of the claims appended hereto.

These and other features and advantages of the present invention will become apparent with reference to the following detailed description of a preferred embodiment thereof in connection with the accompanying drawings wherein like reference numerals have been applied to like elements, in which:

BRIEF DESCRIPTION OF THE DRAWINGS

FIG. 1 schematically illustrates a system architecture utilizing star couplers cascaded with a repeater amplifier which locks up.

FIG. 2 schematically illustrates a star coupler of the present invention which comprises two mixing sections.

FIG. 3 illustrates fabricating the star coupler of FIG. 2 wherein each mixing section is made by fusing together a plurality of optical fibers.

FIG. 4 illustrates a system configuration using conventional star couplers and a repeater amplifier which does not lockup but provides a distorted signal.

FIG. 5 illustrates wave forms at various points in the system configuration of FIG. 4.

FIG. 6 schematically illustrates a system architecture using star couplers of the type shown in FIG. 2, which does not lock-up.

FIG. 7 schematically illustrates a system architecture utilizing a plurality of star couplers of FIG. 2 and a plurality of repeater amplifiers which does not lock-up.

FIG. 8 schematically illustrates a system architecture for large systems, which utilizes a plurality of star couplers shown in FIG. 2 and a repeater amplifier, which does not lock up.

DESCRIPTION OF PREFERRED EMBODIMENTS

Referring to the drawings, several embodiments of the present invention will be explained.

In order to more fully understand communication system configurations using star couplers which do not lockup, it is considered helpful to first describe a system configuration using conventional star couplers that does lock-up.

Referring to FIG. 1, this figure illustrates a system configuration using conventional star couplers that will lock-up. The conventional star couplers shown in FIG. 1 simply have their input and output ports connected via optical fibers which form a mixing section in between the input and the output ports. Starting at terminal or station 36, an optical signal is transmitted through its transmitter port 34 into the fiber optic cable 22a. The signal then enters the star coupler 20 where the signal is mixed in the mixing section 30 with signals being received from other terminals via input ports 26. Normally, system protocol would prevent more than one terminal from transmitting a signal at any particular time. Therefore, the star coupler normally should receive only one signal at any time. One output port of the star coupler 20 is connected to the receiver input 32 of the terminal 36 with the fiber-optic cable 24a. Therefore, each terminal would receive signals from itself and all other inputs to the star coupler 20. By receiving its own signal back, the terminal can determine that it is communicating to and from the star coupler. Generally, one star coupler is sufficient for a small system configuration. Current state-of-the-art permits the connecting up to approximately 64 terminals to one star coupler. However, a plurality of star couplers and at least one repeater may be necessary for large systems.

Still referring to FIG. 1, this figure further illustrates why lockup occurs when an attempt is made to expand the system described thus far by connecting a repeater amplifier to more than one conventional star coupler. In such a system configuration, an optical signal from any terminal, such as terminal 36, is transmitted through cable 22(a) to the star coupler 20. This signal is mixed in the mixing section 30 and transmitted to the repeater amplifier 44 via cable 50, where it is electrically or optically amplified and retransmitted through cable 56 to an input port of another star coupler 21. In star coupler 21 the signal is combined with signals from terminals (not shown) connected to this star coupler and any signal received by star coupler from any other repeater amplifier. A portion of the signal received by star coupler 21 is routed through an output port to cable 54. Cable 54 is connected to a receiver port of the repeater amplifier 44, where this optical signal is amplified and retransmitted via cable 52 to an input port of the first star coupler 20. In the star coupler 20, the signal is again combined with the other inputs to this coupler and a portion of the mixed signal is transmitted through cable 50 to the repeater amplifier 44. This signal again follows the path described by the cables 56, 54, 52, and 50 thereby constituting a continuous loop and thus causing a lockup (continuous loop) of the optical signal.

FIG. 2 discloses a novel star coupler in accordance with the present invention. The star coupler 70, as illustrated in FIG. 2, comprises a housing 71, a plurality of input ports 72 and 73, a plurality of output ports 74 and 75, optical fibers 76, 78, 84, 86, and 88.

Still referring to FIG. 2, a majority of the input ports 72-1 through 72-N are connected to the output ports 74-1 through 74-M with optical fibers via two mixing sections 80 and 82. One end of the first mixing section 80 is directly coupled to the input ports 72 with optical fibers 76a–76d, while the other end is coupled to both the second mixing section 82 and at least one of the output ports 75 via optical fibers 86. Similarly, one end of the second mixing section 82 is directly coupled to the output ports 74-1 through 74-M with optical fibers 78a–78d, while the other end is coupled to the first mixing section 80 via optical fiber 83 and at least one input port 73 via optical fibers 84. In this manner, optical fibers from input ports 73 of the coupler are routed only through the mixing section 82, which is directly coupled to the output ports 74; and optical fibers from output ports 75 are routed only through the mixing section 80, which is directly coupled to the input ports.

In large communication system configurations, star couplers are generally connected to several terminals or stations and at least one repeater amplifier, as illustrated in FIG. 6. Each terminal having its transmitter and receiver port coupled to a star coupler while repeater amplifier is cascaded between the star couplers. Now referring back to FIG. 2, the light signals or the optical signals transmitted by the terminals are inputted to input ports 72 of the star coupler. The optical signals from the terminals are combined in the mixing section 80. The amplified signals from the repeater amplifier are received only in the input ports 73. These signals bypass the first mixing section 80 and mix with other signals only in the second mixing section 82 before being outputted to the output terminals 78. The repeater amplifier receives optical signals transmitted by the terminals from ports 75 only. Since ports 75 receive optical signals from mixing section 80, they are not mixed with any of the signals transmitted by the repeater amplifier to the star coupler via ports 72. Since the optical signals from the repeater amplifier bypass the mixing section 80, the repeater amplifier simply never receives any signal which it had transmitted into the system previously. This system configuration thus cuts off the return path of the amplified optical signals back to the repeater amplifier, thereby preventing the formation of continuous optical loops and hence does not lock-up.

FIG. 3 illustrates the star coupler of FIG. 1 wherein the mixing sections 80 and 82 are fabricated by fusing the optical fibers into mixing sections or zones. The fused zones may be fabricated by etching the cladding from a section of each fiber so that the light signal can exit from the core of each optical fiber, and then twisting these cores with each other or bonding together these fibers along a side to enable the optical signals to communicate from fiber-to-fiber. The star coupler of FIG. 2 having two mixing sections, however, may be fabricated by any of several techniques. One such technique is where the input and output fibers are fused to a "mixing rod". A mixing rod is basically a large diameter fiber-optic bar. Generally, optical couplers will be fabricated with at least two optical fibers branching off from the first fused section 80 to be connected to redundant repeaters via ports 75; similarly, fibers from the redundant repeaters are connected to the star coupler via ports 73.

The principles and advantages of the coupler of the invention can be further demonstrated by referring first to a system wherein two conventional star couplers are connected in series as illustrated in FIG. 4. This particular system, like the system of the invention, will not lock up; however, it has other disadvantages which will become clear. In FIG. 4, all but one of the outputs of the first coupler 100 are connected to the input ports of the second coupler 101. The remaining output 108 from the first coupler 100 is inputted to a repeater amplifier. The return signal from the repeater amplifier is connected to the remaining input 116 of the second coupler 101 after routing through a third optical star coupler 103 via optical cables 126 and 128. This coupler system will not lock-up with any amount of delay in the associated amplifier/star coupler system.

In FIG. 4, if the star couplers are conventional star couplers, the light signal received by the light detector 122 will be a composite of light from the original source 120 and the light returning from the associated coupler 103 and the repeater amplifier 124. Such a composite light signal would result in a very distorted wave form as shown in FIG. 5, which would probably be unusable.

FIG. 6 illustrates an optical communication system utilizing star couplers of the present invention. The system of FIG. 6 will not lock-up, and in addition such a system will not distort the optical signal as will the system shown in FIG. 5. In the system of FIG. 6, two star couplers are coupled to a common repeater amplifier 156 and separate sets of stations (terminals). Stations 152 (S1–SN) are connected to a first star coupler 150 wherein the transmitter port "T" of each station in its set or cluster is connected to a corresponding input port 180 of the first star coupler, and the output port "R" of each station is connected to a corresponding output port 181 of the first star coupler 150. A second set or cluster of stations 154 (S1–SM) is similarly connected to a second star coupler 151. A repeater amplifier 156 having at least two sets of transmitter and receiver ports is connected to the star couplers 150 and 151. The output terminal 182a of the first star coupler 150 is connected to the receiver port 190 of the repeater amplifier 156. The transmitter port 191, which is associated with the receiver port 190, is connected to the input terminal 183a of the second star coupler 151. In a similar fashion, the second set of receiver and transmitter ports of the repeater amplifier 156 are respectively connected to the output terminal 183b of the second star coupler 151 and the input terminal 182b of the first star coupler 150.

Still referring to FIG. 6, the processing of an optical signal transmitted by any of the stations in the system is now described. As an example, an optical signal transmitted by the terminal S1 in the set 152 is first transmitted to the first optical coupler 150 through an input terminal 180 via optical cable 158. This signal is then mixed in the mixing section 194 with all of the other signals transmitted only by any of the stations in the station cluster 152 (S1–SN) connected to the optical coupler 150. A portion of the mixed signal from the mixing section 194 is transmitted to the repeater 156 via optical cables 198a and 160, while the rest of the mixed signal is further mixed in the mixing section 195 with signals received by the optical coupler 150 from the repeater amplifier 156 via cables 166 and 198(b) and then transmitted to the terminal set 152 (S1-SN) via optical cables 168, 170, 172 and the like. The signal received at the repeater amplifier via cable 160 is amplified and transmitted by the transmitter terminal 191 via cable 162 to the second optical coupler 151, where it is mixed in the mixing section 197 and transmitted only to each station in the terminal cluster 154 (S1-SM) connected to the second optical coupler 151. It will be noted that the optical signal received by the second coupler 151 from the repeater amplifier 156 via cable 162 has no path for it to go back to the repeater transmitter and hence to the first optical coupler 150. In other words, the optical fiber 164, which is connected between the second optical coupler 151 and the repeater amplifier 156, is isolated from the signal received by the second coupler 151 from any of the terminals in the cluster 152 (S1-SN) or the repeater amplifier 156. In a similar fashion, a signal transmitted by any of the stations in the cluster 154 (S1-SM) will be first transmitted to the second optical coupler 151, and only a portion of such signal will then be transmitted to the repeater amplifier 156 via cable 164, which is amplified and retransmitted to the stations 152 (S1-SN) via cable 166 and 198b, the mixing section 195 and the cables 168, 170 and 172. It will be seen that the optical signal transmitted by any of the stations in the cluster 152 (S1-SN) after amplification in the repeater amplifier 156 will never return back to the stations 152 (S1-SN), thereby avoiding the possibility of a lockup. Similarly, a signal transmitted by any of the terminals in the cluster 154 (S1-SM) after amplification in the repeater amplifier 156 will never return to the terminals 154 (S1-SM), thereby avoiding the possibility of a lockup.

The reliability of the system as described above and illustrated in FIG. 6 can be increased by using redundant repeater amplifiers as illustrated in FIG. 7. Such a system involves branching out the mixing section of each of the star couplers 150 and 150b into two or more input and output ports. As an example, star coupler 150a shows two ports 200a and 200b for inputs from repeaters 210 and 212, and two ports 202a and 202b for outputs to repeater amplifier 210 and 212. Similarly, the second star coupler 150b has two input terminals 206a and 206b, and two output terminals 204a and 204b. Each star coupler 150a and 150b is thus coupled to redundant active repeaters 210 and 212 via separate receiver cables 201a, 201b and 202a, 202b, etc. In this manner, if either path, such as, 200a or 200b fails, the signal strength received by the terminals in the cluster 152 will be reduced to half which can still be detected and also can be used to warn the operator of the failure. The system redundancy is obviously expandable to more parallel routes by the same technique.

FIG. 8 illustrates a large system architecture using the star coupler of the present invention. Such a system configuration is useful when stations in several geographical areas 230-233 need to communicate to each other. As illustrated in FIG. 8, several stations S1-SN in first geographical area 230 are connected to one star coupler 260 which is then connected to a central repeater amplifier 250. The repeater 250 in such a configuration is designed such that each input is interlocked to the corresponding output such that the input from any star coupler is not returned to the same star coupler, but is distributed to all other star couplers. FIG. 8 illustrates a system with nonredundant repeaters for clarity only. It will be noted that a system with redundant repeaters can be designed easily. The repeater amplifier may further comprise as many channels as desired, and may be designed as modules, for example, four to eight channels which can be interconnected via the common electrical signal bus to form any size system.

The fiber-optic system architectures disclosed in the present invention are very flexible and expandable but have a few interconnection combinations which are not viable: (1) a star coupler can connect to only one repeater. This repeater, however, may be a redundant type; and (2) repeaters may transmit optically to other repeaters but alternate routes (not included in the redundancy discussed herein) are not acceptable.

What is claimed is:

1. An optical star coupler for receiving and transmitting optical signals, comprising a plurality of input and output ports connected by optical fibers coupled together to from first and second mixing sections connected in series between the input and the output ports; at least one additional input port coupled by optical fibers directly to the second mixing section; and at least one output port coupled by optical fibers directly to the first mixing section.

2. The optical star coupler as defined in claim 1 wherein said mixing sections are made of fiber optic bars.

3. An optical star coupler having multiple input and output ports, said input and output ports being connected with optical fibers which are fused in between the input and the output ports to form first and second fused zones connected in series; at least one additional input port fused directly to the second fused zone; and at least one output port fused directly to the first fused zone.

4. The optical star coupler as defined in claim 3 wherein each said optical fiber comprises a core and a cladding, the core of each said fiber in each said fused zone being exposed and twisted with the other exposed cores to enable optical signals to communicate from one fiber to another.

5. A device for receiving and transmitting optical signals, comprising:
   (a) a plurality of input and output ports;
   (b) optical fibers connecting the input and the output ports, said optical fibers being fused together at two zones connected in series between the input and the output ports; and
   (c) at least one additional input port fused only at the zone nearer the output ports; and at least one output port fused only at the zone nearer the input ports.

6. A star optical coupler comprising:
   (a) a plurality of input ports and at least one repeater amplifier input port;
   (b) a plurality of output ports and at least one repeater amplifier output port;
   (c) first and second mixing sections, said first mixing section connected to each said input port, each said repeater amplifier output port and the second mixing section, said first mixing section receiving optical signals from each said input port, mixing the received optical signals and transmitting the mixed optical signal to each said repeater output port and to the second mixing section, said second mixing section connected to each said output port, each said repeater amplifier input port and the first mixing section, said second mixing section receiving optical signals from the first mixing section and from each said repeater amplifier input port, mixing the received optical signals and transmitting the mixed optical signals only to each said output port.

7. A method of forming a star coupler having a plurality of input and output ports comprising the steps of:
   (a) connecting optical fibers to the input and output ports;
   (b) fusing a plurality of the fibers connected to the input ports into a first fused zone;
   (c) connecting at least one fiber from the first fused zone to at least one additional output port;
   (d) fusing the fibers from the first fused zone with the fibers connected to the output ports into a second fused zone; and
   (e) connecting at least one fiber from the second fused zone to at least one additional output port.

8. An optical signal communication system comprising:
   (a) first optical coupler having a plurality of input ports, a plurality of output ports, at least one repeater input port and at least one repeater output port for receiving, mixing and retransmitting optical signals;
   (b) first plurality of terminals, each said terminal having a transmitter and a receiver port, each said transmitter port coupled to an input port of said first optical coupler and each said receiver port coupled to an output port of said first optical coupler;
   (c) second optical coupler having a plurality of input ports, a plurality of output ports, at least one repeater input port and at least one repeater output port, for receiving, mixing and retransmitting optical signals;
   (d) second plurality of terminals, each said terminal having a transmitter and a receiver port, each said transmitter port coupled to an input port of said second optical coupler and each said receiver port coupled to an output port of said second optical coupler; and
   (e) a repeater amplifier coupled to the repeater output terminals of said first and second optical couplers for receiving and amplifying optical signals from said first and second optical couplers, said repeater amplifier also coupled to the repeater input terminals of said first and second optical couplers for transmitting the amplified optical signals to said first and second optical couplers.

9. An optical communication system comprising:
   (a) a repeater amplifier for receiving optical signals, amplifying and retransmitting the amplified optical signals;
   (b) a plurality of star couplers, each said star coupler coupled to the repeater amplifier, each said star coupler transmitting optical signals to the repeater amplifier, each said star coupler also receiving the amplified optical signals from the repeater amplifier and isolating the received amplified optical signals from the optical signal being transmitted to the repeater amplifier; and
   (c) a plurality of set of terminals, each said set comprising a plurality of terminals, each terminal in a said set of terminals coupled to a corresponding said star coupler, each said terminal transmitting optical signals to and receiving optical signals from its corresponding said star coupler.

10. A fiber optic communication system comprising:
   (a) at least one repeater amplifier for receiving optical signals, amplifying and retransmitting the amplified optical signals;
   (b) at least two star couplers, each said star coupler coupled to each of the repeater amplifiers, each said star coupler receiving the amplified optical signals from each of the repeater amplifiers, each said star coupler also transmitting optical signals to each of the repeater amplifiers; and
   (c) an associated plurality of terminals connected to an associated said star coupler to form said communication system, each said terminal transmitting optical signals to each terminal in its said associated plurality through its associated said star coupler, each said terminal also transmitting optical signals to the remaining terminals in said communication system through its said associated coupler and each said repeater amplifier.

11. An optical communication system comprising:
   (a) a plurality of sets, each said set comprising a plurality of terminals, each said terminal capable of receiving and transmitting optical signals;
   (b) at least one repeater amplifier for receiving optical signals, amplifying and retransmitting the amplified optical signals; and
   (c) a plurality of star couplers, each said star coupler coupled to a corresponding said set of terminals and to each said repeater, each said star coupler receiving optical signals from each of the terminals in its corresponding said set of terminals, mixing the received optical signals and redistributing the mixed optical signals to the terminals in its corresponding said set of terminals, each said star coupler also transmitting a portion of the received optical signal from the terminals in its corresponding said set of terminals to each said repeater amplifier, each said star coupler further receiving optical signals from each said repeater amplifier, mixing and redistributing the mixed optical signals only to the terminals in its corresponding said set of terminals.

12. An optical communication system comprising:
   (a) at least one repeater amplifier, each said repeater amplifier receiving optical signals, amplifying and retransmitting the received optical signals;
   (b) a plurality of sets, each said set comprising a plurality of stations, each said station capable of transmitting and receiving the optical signals;
   (c) a plurality of star couplers, each said star coupler coupled to each station in an associated set to each said repeater amplifier, each said star coupler further comprising:
      (i) a plurality of input and a plurality of output ports;
      (ii) at least one repeater input and one repeater output port;
      (iii) first and second mixing sections, said first mixing section coupled to each said input port for receiving optical signals from each station in its associated said set, mixing the received signals and retransmitting the mixed signals to the terminals in said associated set and to each said repeater amplifier through the repeater amplifier output ports, said second mixing section coupled to each said output port, the first mixing section and each said repeater amplifier input port, for receiving optical signals from the first mixing section and transmitting them to each said output port and also for receiving said amplified signals from each said repeater and transmitting the amplified signals only to the terminals in its corresponding said set of terminals.

13. An optical communication system comprising:
(a) "K" repeater amplifiers, where K is an integer, for receiving optical signals, amplifying the received optical signals and retransmitting the amplified optical signals;
(b) N sets of terminals, where N is an integer, each said set comprising a plurality of terminals, each terminal capable of transmitting and receiving optical signals; and
(c) N star couplers, each said star coupler connected to each of the terminals in one of said set of terminals, each star coupler receiving optical signals from its associated terminals, mixing these received optical signals and retransmitting the mixed optical signals to its said associated terminals, and also transmitting the mixed optical signals to each of the K repeaters, each said coupler receiving optical signals from each of the repeaters, mixing these received optical signals and retransmitting them only to its said associated terminals.

14. An optical communication system comprising:
(a) a plurality of sets, each said set comprising a plurality of terminals;
(b) at least one repeater amplifier for receiving the optical signals, amplifying and retransmitting the amplified optical signals; and
(c) a plurality of optical couplers, each said coupler coupled to each of the terminals in an associated said set of terminals and each of the repeater amplifiers, each said star coupler receiving optical signals from each of the terminals in its associated said set of terminals transmitting the received signals to the terminals in its associated set of terminals and also transmitting the received signals to each of the terminals in each of the remaining said sets of terminals through each of the repeater amplifiers, each said coupler also receiving the amplified optical signals from each of the repeater amplifiers which had been transmitted by the terminals in each of the remaining said sets of terminals, thereby avoiding the lockup of the optical signals.

15. An optical communication system comprising:
(a) a plurality of sets, each said having a plurality of terminals, each said terminal capable of receiving and transmitting optical signals;
(b) at least one repeater amplifier means for receiving the optical signals, amplifying and retransmitting the amplified optical signals;
(c) a plurality of star couplers, each said star coupler coupled to each of the terminals in an associated set of terminals, each said coupler enabling
  (i) the optical signals transmitted by each of the terminals in its associated said set of terminals to be transmitted to each of the terminals in its associated said set of terminals, and to each terminal in each of the remaining said sets of terminals only through each of the repeaters; and
  (ii) the signals transmitted by each repeater amplifier to be transmitted only to the terminals in its associated said set of terminals, thereby enabling each said terminal in the system to communicate with each other without lockup.

16. The optical communication system as described in claim 15 wherein each said optical star coupler further comprises:
(a) a plurality of input and output ports; and
(b) a plurality of fibers connecting the input and the output ports, said fibers coupled together to form first and second mixing sections between the input and the output ports such that the fibers connected to at least one input port are only coupled to the second mixing section and the fibers connected to at least one output port are only coupled to the first mixing section.

17. The optical communication system as defined in claim 16, wherein each said first and second mixing sections are made of fiber-optic bars.

* * * * *